J. SCHUETTE.
PIPE JOINT.
APPLICATION FILED FEB. 20, 1922.
1,420,671. Patented June 27, 1922.
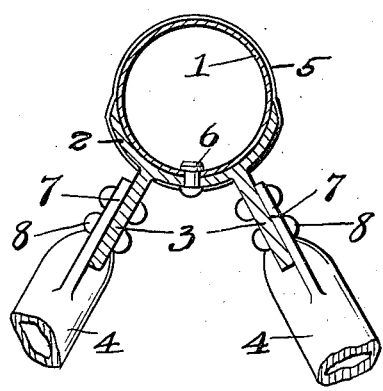
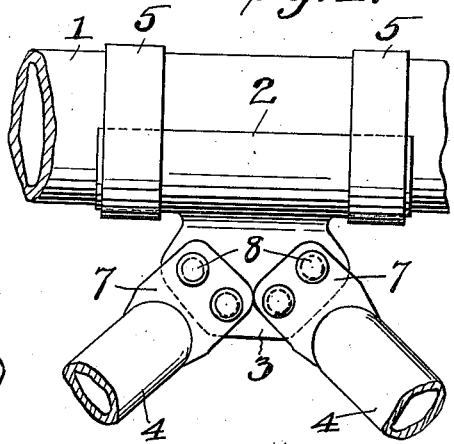
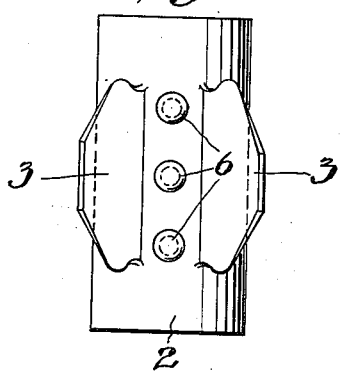
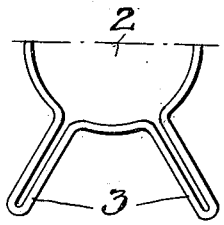
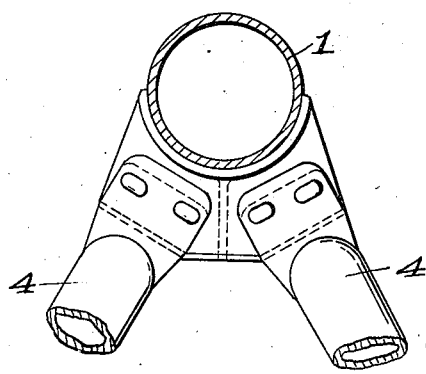
Inventor
Johann Schuette,
By Blackwood Bro.,
Attorneys.

UNITED STATES PATENT OFFICE.

JOHANN SCHUETTE, OF ZEESEN-KOENIGS-WUSTERHAUSEN, NEAR BERLIN, GERMANY, ASSIGNOR, BY MESNE ASSIGNMENTS, TO AMERICAN INVESTIGATION CORPORATION, OF NEW YORK, N. Y., A CORPORATION OF MARYLAND.

PIPE JOINT.

1,420,671.  Specification of Letters Patent. Patented June 27, 1922.

Original application filed April 25, 1919, Serial No. 292,767. Divided and this application filed February 20, 1922. Serial No. 537,666.

*To all whom it may concern:*

Be it known that I, JOHANN SCHUETTE, residing at Zeesen-Koenigs-Wusterhausen, near Berlin, Germany, a citizen of the Republic of Germany, have invented certain new and useful Improvements in Pipe Joints; and I do hereby declare the following to be a full, clear, and exact description of the invention, such as will enable others skilled in the art to which it pertains to make and use the same, this being a division from an application for a patent upon improvements in pipe joints filed by me on April 25th, 1919, bearing Serial No. 292,767.

My invention relates to improvements in joints or couplings for connecting pipes or tubes which are formed into framed or braced girders and similar structures, such as are used in the framing of rigid airships, and especially to such joints as are used in connection with the attachment of ties and braces to tubular members of such framing.

The structures in which my invention is adapted to be used consist of girders, composed of tubes or pipes for the principal longitudinal members, these longitudinal members being held and braced in definite relation to each other by a lattice system of diagonal braces.

It is evident that the stresses upon such girders are located at and transmitted through the points at which the bracing members are attached. For this reason it is important that the strength of the principal longitudinals be not reduced at the points of attachment of the braces, but rather that it be augmented by suitable reinforcement at such places in the structure.

It is the object of my invention so to construct the joints that this reinforcement is effected without the addition of superfluous material, an essential in structures such as the framing of rigid airships, in which lightness, as well as stiffness and strength, is desirable. I attain this object by the use of a fitting which is a combination of straps and webs, in connection with bands or rings for holding the various parts together.

In the accompanying drawings, Fig. 1 shows a cross section of one of the tubular members of a framed girder together with a cross section of a combination strap and webs, and elevations of the ends of braces attached thereto; Fig. 2 shows an elevation of one of the tubular members of a framed girder, with a strap or saddle and its attaching bands, and the ends of braces; Fig. 3 shows an elevation of a strap or saddle and webs, as seen from below; Fig. 4 shows a cross section of a modified form of strap and webs; and Fig. 5 shows a cross section of one of the tubular members of a framed girder, together with a strap in which the web is at right angles to those shown in Fig. 1, together with elevations of the ends of braces attached thereto. Similar reference numbers in the several figures refer to similar parts.

At 1 is shown the tubular member, to which the strap or saddle 2 is fitted. At 5—5 are shown bands or collars, surrounding the tube 1, and saddle 2. The strap or saddle 2 is provided with webs 3—3, formed integrally with it, and at such angular relation as may be desired to correspond with the direction intended for the attached braces 4—4. The braces 4—4 are provided with flattened ends 7—7 as shown, enabling them to be attached to the webs 3—3 by rivets 8—8.

The ends of the strap or saddle 2 are made with a slight taper, and the bands or collars 5—5 are made with a corresponding taper inside, so that when the bands or collars are driven on, the strap or saddle 2 will be firmly held to the tubular member 1; or the bands or collars 5—5 may be shrunk on.

At 6—6—6 are shown dowel pins, riveted to the strap or saddle 2, the cylindrical heads of which pins 6—6—6 engage with corresponding holes drilled in the tubular member 1. These pins act to transmit the angular thrust of the braces 4—4 to the tubular member 1, and prevent the strap or saddle 2 from shifting on the tubular member 1. The bands or collars 5—5 are shrunk or driven on the strap or saddle 2, and being made slightly tapering on the inside, the driving into position draws the strap or saddle 2 firmly to the tubular member 1. The bands or collars 5—5 may be further secured from sliding off by any well known means.

The strap or saddle 2 may be formed as a solid casting or forging, or may be made as shown in Fig. 4, this form being bent or shaped out of sheet metal.

It is evident that this method of fastening or connecting pipe members of a framed structure does not detract from the strength of the tubular member 1, but strengthens it by the additional strength of the strap or saddle 2, and the bands or hoops 5—5.

I claim:

1. In a joint connecting tubular members, a coupling member intermediate between the tubular members, said coupling member having a web projecting therefrom, the other tubular member being riveted to the web on said coupling member; and means carried by the former tubular member adapted to hold the coupling member to said tubular member.

2. In a joint connecting tubular members, a coupling member intermediate to the tubular members, said coupling member contacting with a part of the surface of one of the said tubular members and having a web projecting therefrom; the other of the said tubular members being riveted to the web on the coupling member; pins carried by the coupling member adapted to fit into and engage in holes provided in the first named tubular member to hold the coupling member thereto against displacement; and rings carried by the last mentioned tubular member, adapted to hold the coupling member to the said tubular member.

3. In a joint connecting tubular members, a coupling member intermediate to the tubular members, said coupling member contacting with a part of the surface of one of the said tubular members and having a web projecting therefrom, said web being disposed transversely to the axis of said tubular member, and rings carried by the former tubular member adapted to hold the coupling member to the said tubular member.

4. In a joint for connecting a plurality of tubular members; tubular members, a coupling member intermediate to the tubular members, having a web projecting therefrom, tubular members connected to said web, and rings for holding the coupling member to the other tubular member.

5. In a joint for connecting a plurality of tubular members; a tubular member, a plurality of tubular members, a coupling member having a web projecting therefrom, the plurality of tubular members connected to said web, and tubular means for holding the coupling member to the tubular member.

In testimony whereof I have affixed my signature.

JOHANN SCHUETTE.